(12) United States Patent
Kelm-Kläger

(10) Patent No.: US 6,502,453 B1
(45) Date of Patent: *Jan. 7, 2003

(54) METHOD AND APPARATUS FOR TESTING TIRES

(75) Inventor: Ronald Kelm-Kläger, Landsberg (DE)

(73) Assignee: Beissbarth GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/527,346

(22) Filed: Mar. 17, 2000

(30) Foreign Application Priority Data

Mar. 17, 1999 (DE) .......................... 199 11 913

(51) Int. Cl.⁷ .............................. G01M 17/02
(52) U.S. Cl. ..................................... 73/146
(58) Field of Search ............. 73/146, 117, 123; 152/450

(56) References Cited

U.S. PATENT DOCUMENTS 5,934,824 A * 8/1999 Vural ..................... 404/117
6,006,599 A * 12/1999 Kelm-Klager et al. ........ 73/146
6,012,329 A * 1/2000 Kelm-Klager et al. ........ 73/146
6,041,649 A * 3/2000 Fembock ..................... 73/146

FOREIGN PATENT DOCUMENTS

EP 0 884 574 A2 12/1998
EP 0 884 574 A3 7/1999

* cited by examiner

*Primary Examiner*—William Oen
(74) *Attorney, Agent, or Firm*—Crompton, Seager & Tufte LLC

(57) ABSTRACT

In the tire testing method before and after an alteration in the tire pressure a respective interferogram is produced of the tire surface using coherent radiation and the interferogram is used to obtain an information concerning any defects present in the tire is obtained. The tire testing apparatus comprises a rotatably supported shaft on which the wheel with the tire to be tested is mounted, a bearing device by which the wheel with the shaft is shiftable in longitudinal direction of the shaft, a shaft locking device by which the shaft is locked with respect to a movement in the longitudinal direction of the shaft thereafter, a guiding device by which the test head is moved in a radial direction of the wheel, a wheel locking device by which the wheel is mechanically locked when the wheel is further rotated by hand by an amount of a test segment and when the next segment is in test position in front of the test head, and a starting device by which the testing on defects of a first test segments of the tire is started.

13 Claims, 8 Drawing Sheets

METHOD AND APPARATUS FOR TESTING TIRES

The invention relates to a method of testing tires, wherein before and after an alteration in the tire pressure a respective interferogram is produced of the tire surface using coherent radiation and, from the interferogram, the information concerning any defects present in the tire is obtained, and furthermore to an apparatus for the performance of the method.

BACKGROUND OF THE INVENTION

The German patent publication 42 31 578 A1 discloses a method for the determination of the structural strength of tires, in which the tire is illuminated with coherent light, the radiation diffusely reflected back from the tire is divided up in a twin beam interferometer into two beam parts, in the twin beam interferometer one of the two beam parts is tilted in relation to the other beam part as a shearing operation, in the twin beam interferometer one of the two beam parts is phase shifted in steps, the radiation diffusely reflected by the object being tested and split up into two beam parts and then united again is returned through components presenting an image of the surface of the tire with a large aperture to an electronic image sensor system and the signals produced by the image sensor system are digitalized and further processed to give a modulo $2\pi$ image and the modulo $2\pi$ image is confirmed as an output gray value image.

In accordance with the German patent publication 195 02 073 A1 the above mentioned method is further developed to the extent that the output gray value image is partially differentiated, a second gray value image identical to the output gray value image is produced and it is geometrically displaced in the shearing direction in relation to the output gray value image and is altered by a gray value which is constant over the entire image area and the second gray value image manipulated in this manner is subtracted from the output gray value image and so that a resulting gray value image is produced, from which any defects in the tire may be seen.

When it is considered that structural damage in tires and more particularly in the carcass including the belt, may in the case of car tires substantially impair the safety of the vehicle, it will be seen to be desirable for a device to be available able to perform tire testing.

The EP 0 884 574 discloses a method of testing tires wherein before and after an alteration in the tire pressure a respective interferogram is produced of the tire surface using coherent radiation and, from the interferogram, the information concerning any defects present in the tire is obtained. For testing a tire, the wheel having the tire to be tested is mounted on a balancing machine. A testing head located at the balancing machine, is moved towards the tire up to a preselected testing distance for deriving the interferogram. The testing on defects is carried out at a first testing segment of the tire. Thereafter, the wheel is rotated on by the balancing machine in the amount of a testing segment, and the last mentioned steps are repeated until the complete tire is tested. The tire testing apparatus comprises a balancing machine on which the wheel having the tire to be tested, is mounted, a positioning device for the testing head by means of which device the testing head is moved towards the tire up to a preselecting testing distance for deriving the interferograms, and a control device for the balancing machine in order to rotate the wheel by the amount of a testing segment forwards when the testing of the previous testing segment has been completed.

Since the costs for the test head are substantially dependent on the area which may be covered in a single measuring step, the above mentioned method is advantageous in that the costs for the test head may be reduced substantially in that a segmentwise testing of the tire is provided for, wherein a plurality of testing segments of the tire are subsequently brought into the field of view of the test head. On the other hand, the required investments are higher than necessary when the user only needs a tire testing device but no balancing machine.

SUMMARY OF THE INVENTION

It is the object of the invention is to create a tire testing method and apparatus rendering possible the testing of tires by as simple means as possible.

For this purpose, the method in accordance with the invention provides that, for testing a tire, the wheel which has the tire to be tested, is mounted on a rotatable shaft of a tire testing machine, that the distance of the tire from the test head is adjusted thereby that the wheel is shifted together with the shaft in the direction of the shaft, and that the shaft is locked thereafter, that the relative location of the test head with respect to the tire is adjusted thereby that the test head is, in order to bring it into position for differently sized tires, moved in a vertical direction, that the wheel is, thereafter, rotated further on by the amount of a testing segment by hand and locked mechanically when the next segment is in a test position in front of the test head, that the testing as to defects is carried on a first testing segment of the tire, and that the two last mentioned steps are repeated until the complete tire has been tested.

Some expenditure for hardware may be saved in that the wheel is rotated by hand. However, it has to be taken care that the wheel is rotated exactly by one segment since otherwise the position of the detected defects cannot be evaluated with a sufficient accuracy, and that the test head is positioned accurately in relation to the tire. This, however, is ensured by the way in which the machine is adjusted and by the mechanical locking of the shaft with the wheel. The test head may be arranged in a simple manner and without further means at an accurate testing position by such a simple scheme of movements.

In accordance with an advantageous development of the method, the relative position of the test head with respect to the tire adjusted thereby that the test head is moved in a vertical direction and perpendicular to the longitudinal direction of the shaft. Thereby, advantages are obtained with respect to the integration of the test head into the tire testing apparatus, and the adjustment of the test head can be carried out from above, which means from the console of the apparatus.

In accordance with an advantageous development of the method, the field of view of the test head is inspected by means of a camera which is arranged in the test head and is directed to the tire whereby the picture taken by the camera, is shown on a monitor. Thereby, it can be verified without further means when the test head is in the correct position with respect to the tire, and there are no further measurements necessary in order to verify this. It is also advantageous that the monitor which is already provided for, is also used for this purpose.

In accordance with a further advantageous embodiment of the method of the invention, the values necessary for the further rotation of the wheel, for example the tire size, are input into a computer, and the computer issues an information about the number of segments which are required in order to test the complete tire. If the sizes are stored in form of a table, this table can concurrently be updated by inputs made by hand such that the effort for the adjustment for a test run is becoming ever smaller.

A further advantageous embodiment of the method of the invention is characterized in that the number of the required segments is adjusted at the shaft. This adjustment is done by hand while using the information given from the computer. Therefore, the corresponding adjustment can be made with a minimum of hardware.

A further advantageous embodiment of the method of the invention is characterized in that, upon adjustment of the distance between the test head and the tire, this distance is watched and an indication is given when the test head has reached the desired distance, and that the test head is, thereafter, locked. Thereby, a secure, fast and accurate adjustment of the test head with respect to the tire is possible.

A further advantageous embodiment of the method of the invention is characterized in that the pressure of the tire is reduced for each test step, whereby, after completing the tests, the pressure is brought back to the nominal pressure. With this method, the changing of the pressure of the tire may be carried out during the whole test cycle in which the test segments are measured successively at a minimum of time loss, since the changing of the pressure from the first test step to the second test step begins at the final pressure which is present at the end of the first test step. Furthermore, the tire has to be at rest for a given time period after each change of pressure such that the test results are not influenced by the continued movements which are caused by the pressure change. Therefore, the time needed for such a recovery or rest time period is minimized when the number of pressure changes which are made during a test cycle, is brought to a minimum. The number of recovery or rest time periods would increase when the tire pressure would be brought to nominal pressure after each tire test step with respect to a specific portion of the tire.

For solving the above object, the tire testing apparatus according to the invention comprising a air pressure device for changing the tire pressure as well as a test head and a computer which before and after an alteration in the tire pressure produce a respective interferogram of the tire surface using coherent radiation and, from the interferogram, obtain the information concerning any defects present in the tire is characterized by a rotatably supported shaft on which the wheel with the tire to be tested is mounted, by a bearing device by which the wheel with the shaft is shiftable in longitudinal direction of the shaft, by a shaft locking device by which the shaft is locked with respect to a movement in the longitudinal direction of the shaft thereafter, by a guiding device by which the test head is moved in a radial direction of the wheel, by a wheel locking device by which the wheel is mechanically locked when the wheel is further rotated by hand by an amount of a test segment and when the next segment is in test position in front of the test head, and by a starting device by which the testing on defects of a first test segments of the tire is started.

An advantageous embodiment of the tire testing apparatus according to the invention is characterized in that the computer comprises a storage in which a table is stored which contains data as to the number of segments which are required for rotating on the wheel in dependence of the size of the wheel. The storage in the computer ensures that as little as possible knowledge is necessary for operating the apparatus.

An advantageous embodiment of the tire testing apparatus according to the invention is characterized in that the bearing device comprises a rotatably supported outer shaft and an inner shaft rotatably supported within the outer shaft as well as an unlockable locking device connecting the outer shaft to the inner shaft, whereby in particular the locking device comprises a clamping hub between the outer shaft and the inner shaft and a lockable locking wheel, whereby the locking of the locking device may be loosened or tightened by rotating the inner shaft. Thereby, the shaft with the wheel may be shifted in longitudinal direction of the shaft in a simple mechanical way in order to implement the desired distance between the test head and the tire.

An advantageous embodiment of the tire testing apparatus according to the invention is characterized in that the guiding device for the test head comprises a crank drive which is mechanically or hydraulically or electromagnetically lockable whereby the crank drive is arranged in a vertical direction and perpendicular to the longitudinal direction of the shaft. Thereby, a simple and accurate positioning of the test head is possible without a specific knowledge or ability being required at the side of the person operating the machine.

In this context it is, furthermore, advantageous if the guiding device and the test head are integrated into a housing on the tire testing apparatus. This embodiment of the invention has the advantage that the volume required by the machine, is minimized, and that the test head is protected somehow within the housing of the tire testing apparatus which is a profound advantage having in mind the rough environment being present at automobile service shops where such machines are used.

An advantageous embodiment of the tire testing apparatus according to the invention is characterized by a camera which is arranged in the test head and which is directed to the tire, whereby the field of view of the test head is inspected by means of the camera by displaying the picture taken from the camera on the monitor.

An advantageous embodiment of the tire testing apparatus according to the invention is characterized in that the wheel locking device comprises index discs arranged on the outer shaft having index recesses the number of which corresponds to a different number of test segments, and that a lever with a cam is provided which engages the index recesses with the cam.

An advantageous embodiment of the tire testing apparatus according to the invention is characterized by a distance setting device for setting the distance between the test head and the tire.

An advantageous embodiment of the tire testing apparatus according to the invention is characterized in that the distance adjusting device comprises a mechanical keying device on the test head which keying device touches the tire upon reaching the test distance. This is a mechanical version of the distance adjusting device which is adapted to the rough environment in a simple way.

An advantageous embodiment of the tire testing apparatus according to the invention is characterized by a valve which may be adjusted with respect to the size of its opening as well as with respect to the opening time duration. Such a valve enables a fast and automatic adjustment of the pressure of the tire under the control of a computer which only controls the size of the valve opening and the opening time duration of the valve. This is also an advantage with respect to minimizing the required time duration for carrying out a complete test cycle.

An advantageous embodiment of the tire testing apparatus according to the invention is characterized by a main or central control device for controlling the air pressure in the tire whereby the pressure in the tire is to be reduced for each test step by one step and has to be brought back to the nominal pressure upon termination of a test. As already mentioned, this minimizes the required time for carrying out a complete test method cycle.

A further understanding of the nature and advantages of the present invention may be realized by reference to the remaining portions of the specification and the drawings.

Working embodiments of the invention will now be described with reference to the accompanying drawings.

DESCRIPTION OF THE SPECIFIC EMBODIMENTS

Figure 1:
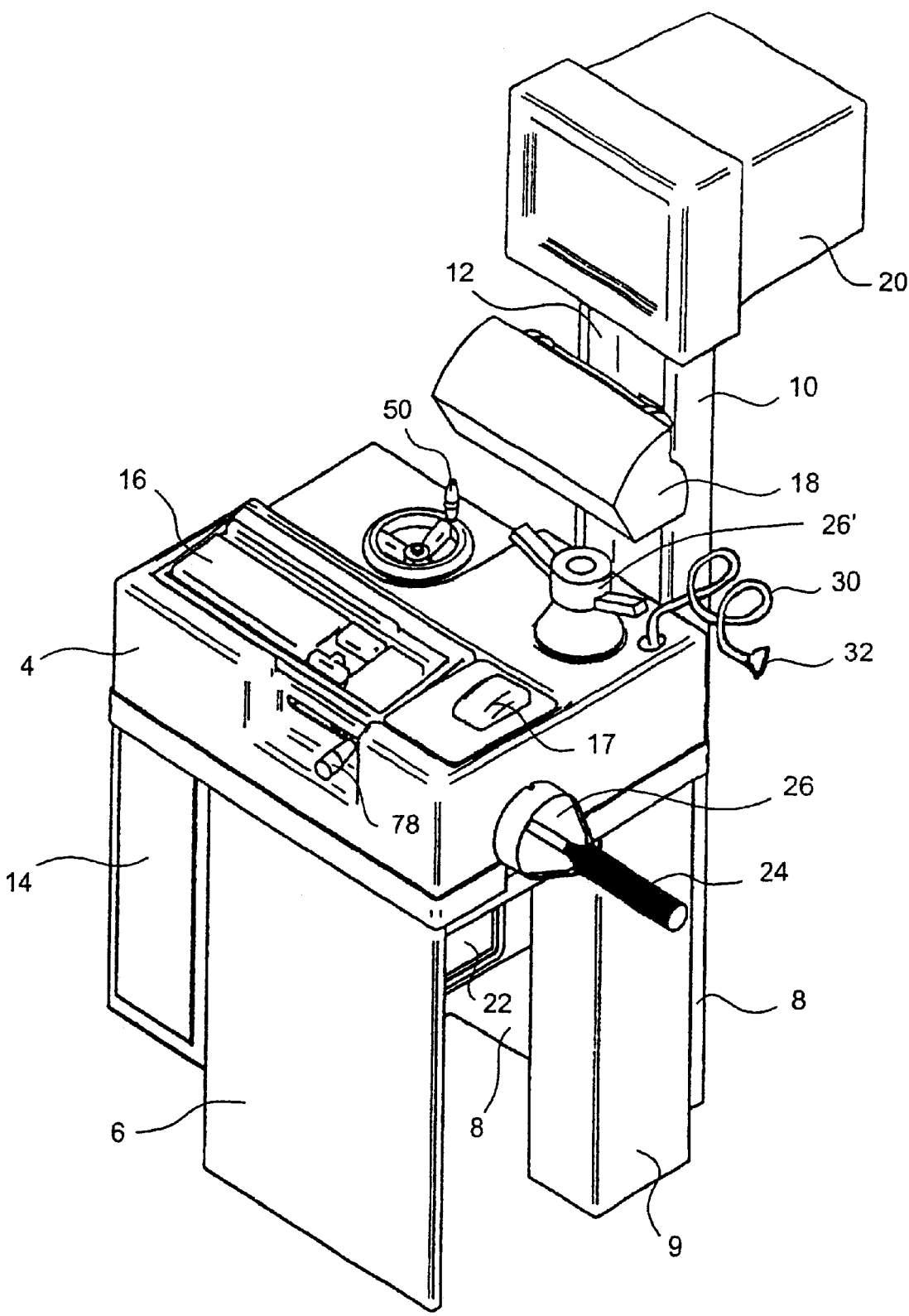
FIG. 1 diagrammatically shows in plan view a tire testing apparatus in accordance with an embodiment of the invention.

FIG. 1 shows a tire testing apparatus having a housing 2 consisting of a console 4, a front housing wall 6, a rear housing wall 8, a column 9 and two columns 10, 12, and in which housing the main components of the tire testing apparatus, namely a computer 14 with a keyboard 16, a "mouse" 17, a printer 18 and a monitor 20 are arranged. A test head 22 is arranged in the interior of the housing as is shown in perspective view in FIG. 1 and schematically in FIG. 2.

Figure 2:
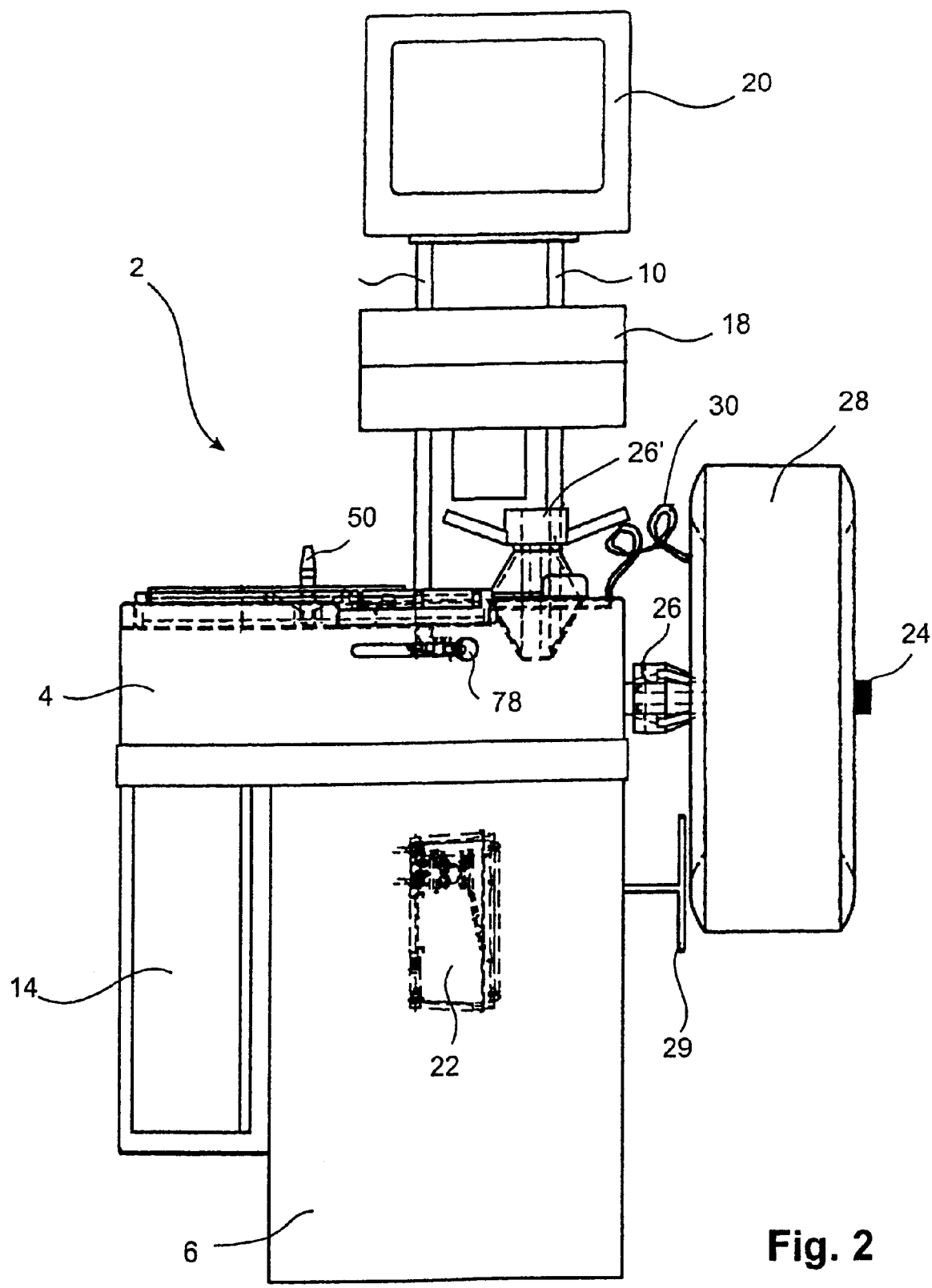
FIG. 2 shows a side plan view of the tire testing apparatus of FIG. 1.
Figure 3:
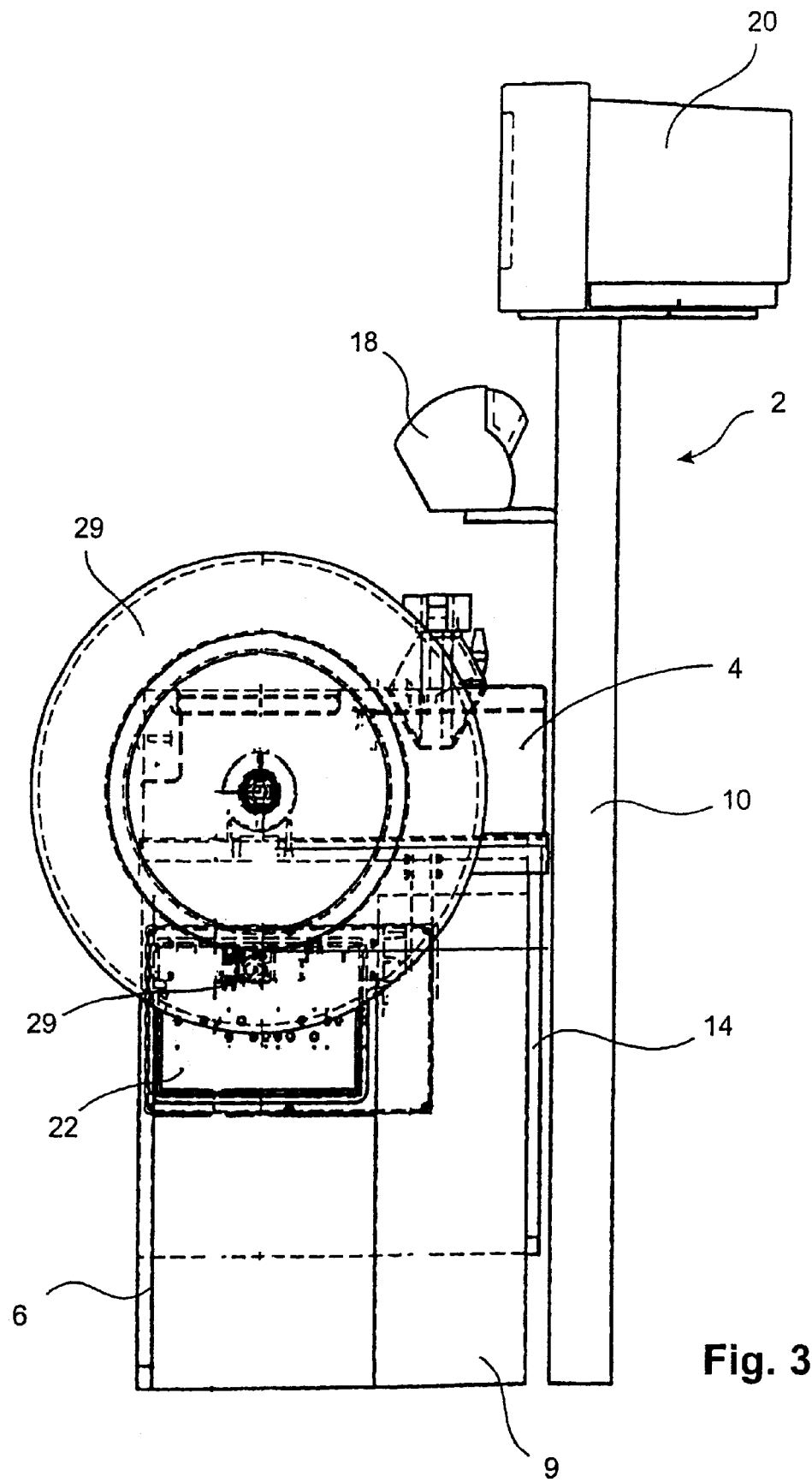
FIG. 3 shows a further side plan view of the tire testing apparatus of FIG. 1.

Furthermore, a shaft 24 is journalled within the housing 2, on which shaft a wheel 28 may be fixed by means of a fast clamping device 26, 26' as is shown in FIG. 2. In FIG. 1, the one part 26 of the fast clamping device is shown on the shaft 24 and the other part 26' of the fast clamping device is shown on the console where it may be deposited. The mounted condition of the fast clamping device is described below.

The computer 14 serves as a central computing device for controlling the function of the tire testing apparatus. The computer has a storage in which a table is stored which contains data related to the number of segments which are required for rotating on a wheel in relation to the size of the wheel. A camera 29 is arranged at the test head 22 and is directed to the tire 28 whereby the field of view of the test head 22 is detected by the camera 29 in that the picture taken by the camera 29 is displayed on the monitor.

A control device for the air pressure of the tire to be tested is also arranged in the housing 2, and a pressurized air conduit 30 having a valve 32 is shown in FIG. 1 and FIG. 2.

The air pressure device shown in FIGS. 1 and 2 having the pressure conduit 30 and the valve 32 serves for carrying out the pressure changes in the tire of the wheel to be tested. The valve 32 is adapted to be controlled with respect to its opening (discharge quantity per unit of time) as well as with respect to opening and closing thereof such that the pressure change in the tire may be controlled by means of the valve opening and by means of the time duration as well, during which the valve is opened.

The distance between the test head 22 and the side wall of the tire of the wheel 28 is determined, in the embodiment of FIG. 2, by means of a keying device 29 which is pivotally mounted on the housing 2. When the wheel is at the correct distance from the test head 22, the keying device 29 touches the tire, and the adjustment of the wheel in longitudinal direction of the shaft 24 is, thereby, finished.

Figure 4:
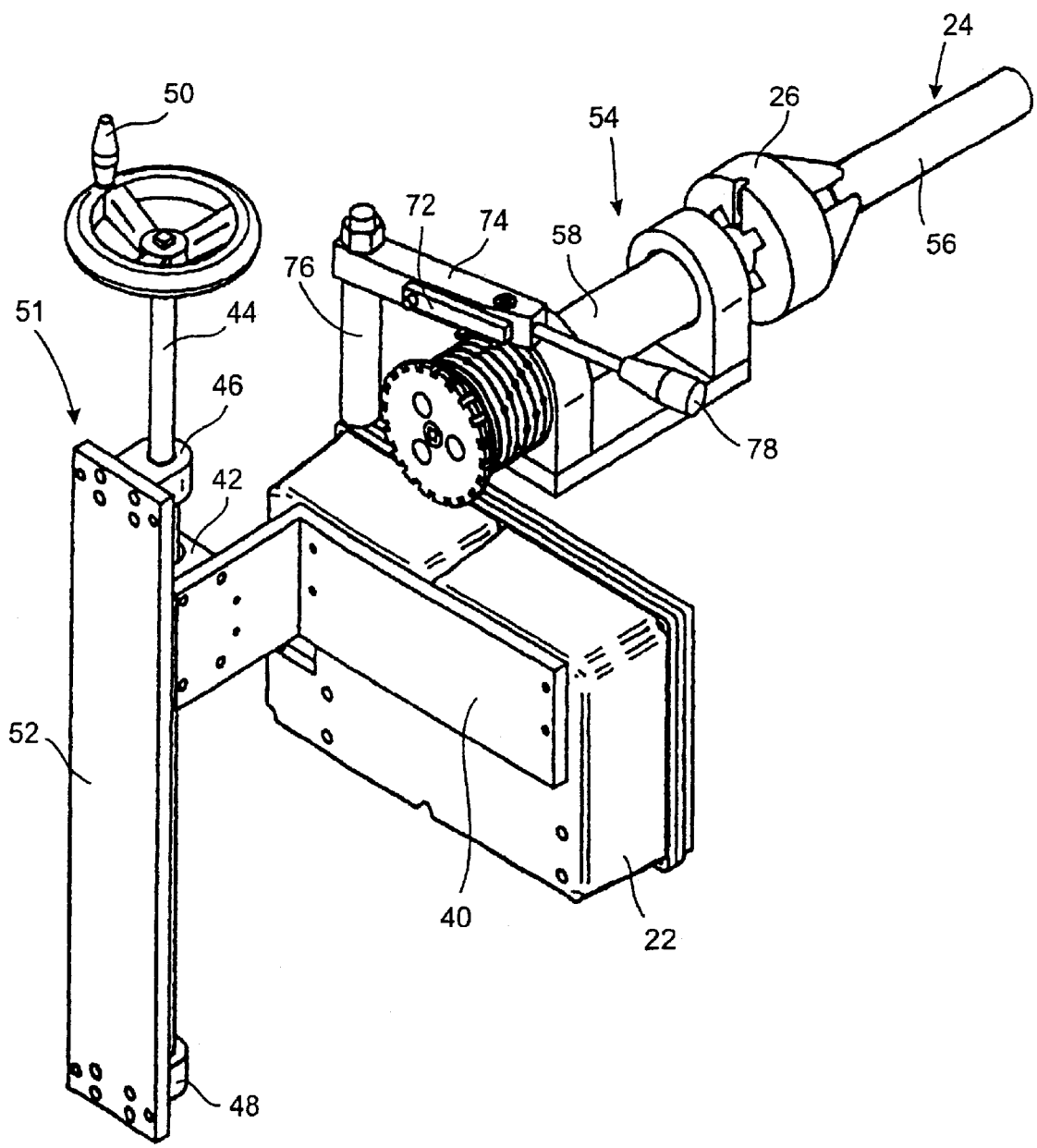
FIG. 4 shows the positioning device for positioning the test head in relation to a wheel on the tire testing apparatus.

In FIG. 4, the positioning device is shown in perspective view, by means of which positioning device the distance between the test head 22 and the tire of a wheel mounted on the shaft 24 and the vertical position of the test head 22 with respect to the tire of the wheel 28 may be adjusted.

The test head 22 is mounted on an angular element 40 which is itself mounted to a slide 42 which may be moved upwards and downwards, i.e. perpendicular to the longitudinal direction of the shaft 24 by means of a threaded shaft 44 which is journaled in bearings 46, 48, by means of a crank 50. The guiding device for the test head comprises a crank device 51 which is mechanically or hydraulically or electromagnetically lockable. The crank drive 51 arranged in vertical direction and in perpendicular to the longitudinal direction of the shaft 24. The crank drive 51 and the test head 22 are integrated in the housing of the tire testing apparatus. The bearings 46, 48 are connected to the housing 2 through a base plate 52 in the interior of the housing 2.

Figure 5:
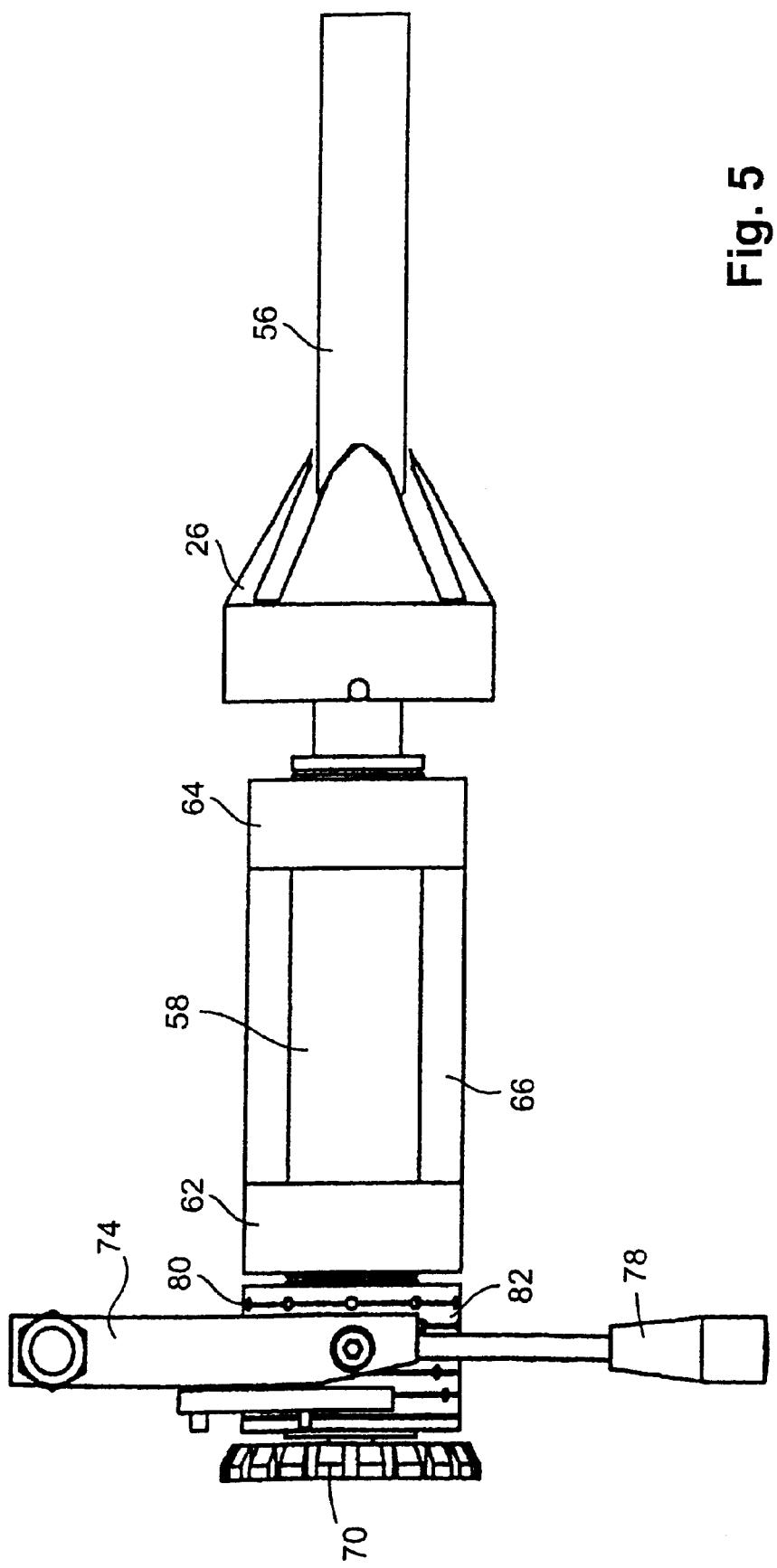
FIG. 5 shows a perspective view of the bearing device of the shaft.
Figure 6:
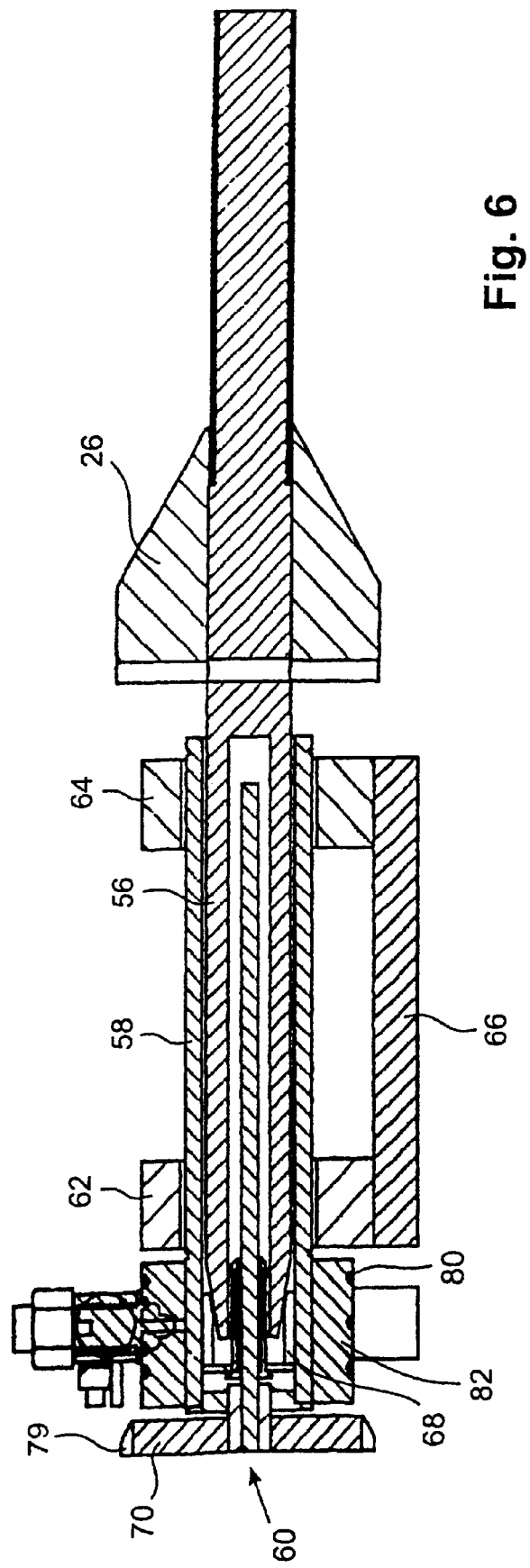
FIG. 6 shows a section through the device of FIG. 5.
Figure 7:
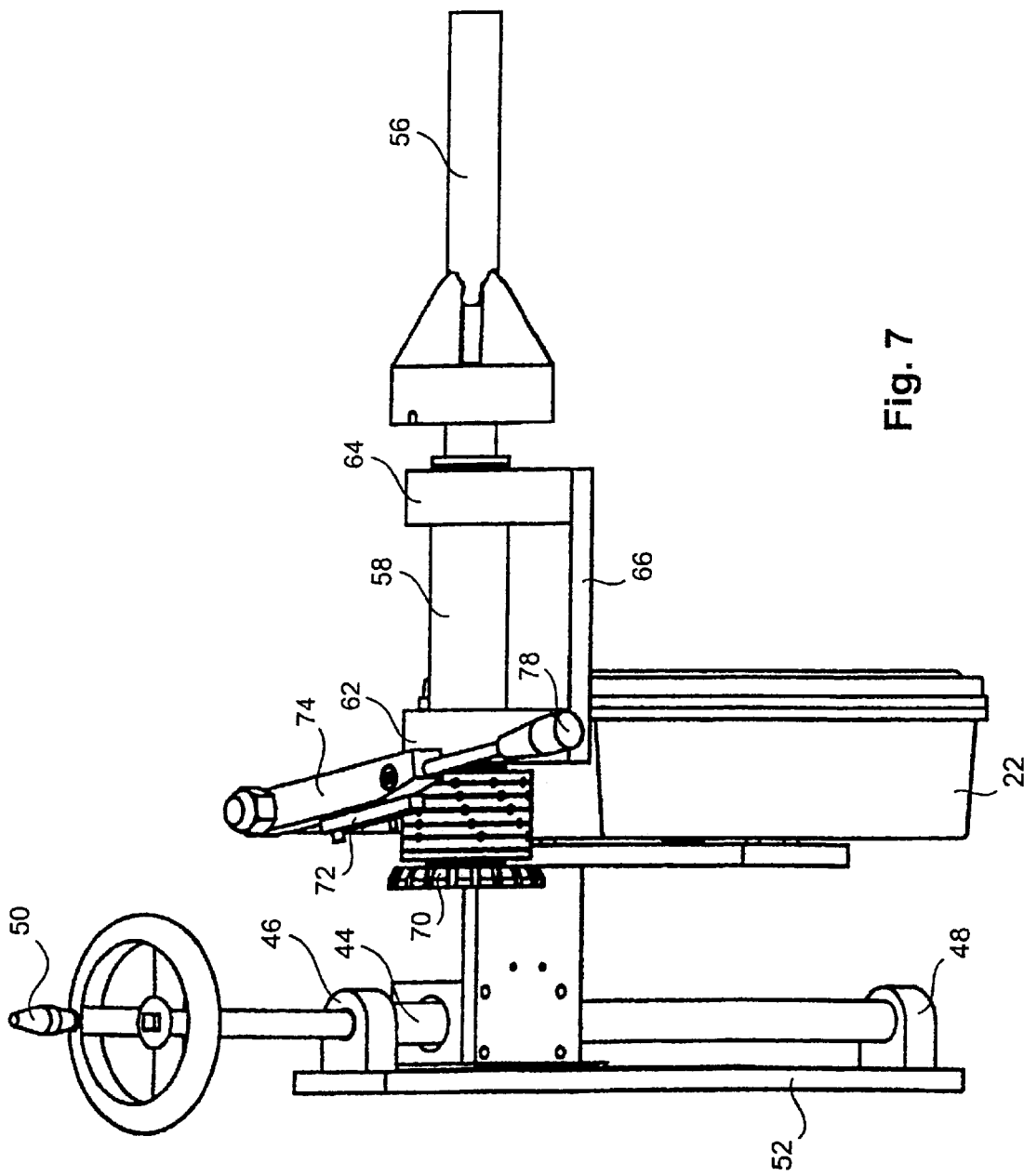
FIG. 7 a further section through the device of FIG. 5.

The wheel with the shaft 24 is journaled in a bearing device 54 such that it may be shifted in longitudinal direction of the shaft, which bearing device is shown in perspective view in FIG. 4, in plane view in FIG. 5 and in section in FIG. 6. The bearing device 54 comprises a rotatably supported outer shaft 58 comprises a rotatably journaled outer shaft 58 and an inner shaft 56 rotatably journalled within the outer shaft 58 as well as an unlockable locking device 60 connecting the outer shaft 58 with the inner shaft 56. As can be seen from FIGS. 4 to 6, the outer shaft 58 is journalled on two bearings 62, 64 which are mounted in the housing 2 through a base plate 66.

The locking device 60 comprises a clamping hub 68 connecting the outer shaft 58 with the inner shaft fixed against rotation when the clamping hub is tightened. In order to remove the locking condition, the outer shaft which is connected to a locking wheel 70 is held stationary by locking the locking wheel 70. Thereafter, the inner shaft is turned in a first rotating direction in order to loosen the clamping hub 68. In this condition, the inner shaft 56 may be repositioned with respect to the outer shaft 58 in longitudinal direction of the shafts in order to adjust the distance between the tire and the test head. When the inner shaft 56 is turned in the opposite rotating direction, the clamping hub 68 is tightened again, and a connection between the two shafts fixed against rotation is provided. When the locking wheel 70 is freed again, the shaft with the wheel may be rotated freely.

The arresting of the locking wheel 70 is effected by means of a resiliently biases cam 72 which is fixed to a lever 74 which is pivotally fixed to a column 76. The lever 74 may be pivoted to the left in FIG. 4 by means of a handle 78 such that the locking finger 72 engages into corresponding recesses 79 in the locking wheel 70 in order to arrest the locking wheel and, thereby, the outer shaft 58.

As is shown in FIG. 6, the resiliently biases cam 72 is arranged on the lever 74, which cam engages index recesses 80 on positioning rings 82. The came may be positioned to different index rings by means of the handle 78 such that the rotation of the shaft 24 is locked after each test segment in relation to the size of the tire. At the position in which the lever 78 extends out of the housing, markings are provided, and the computer shows on the monitor which marking is to be chosen by the lever 78 as soon as it has been input to the computer which tire is to tested.

Figure 8:
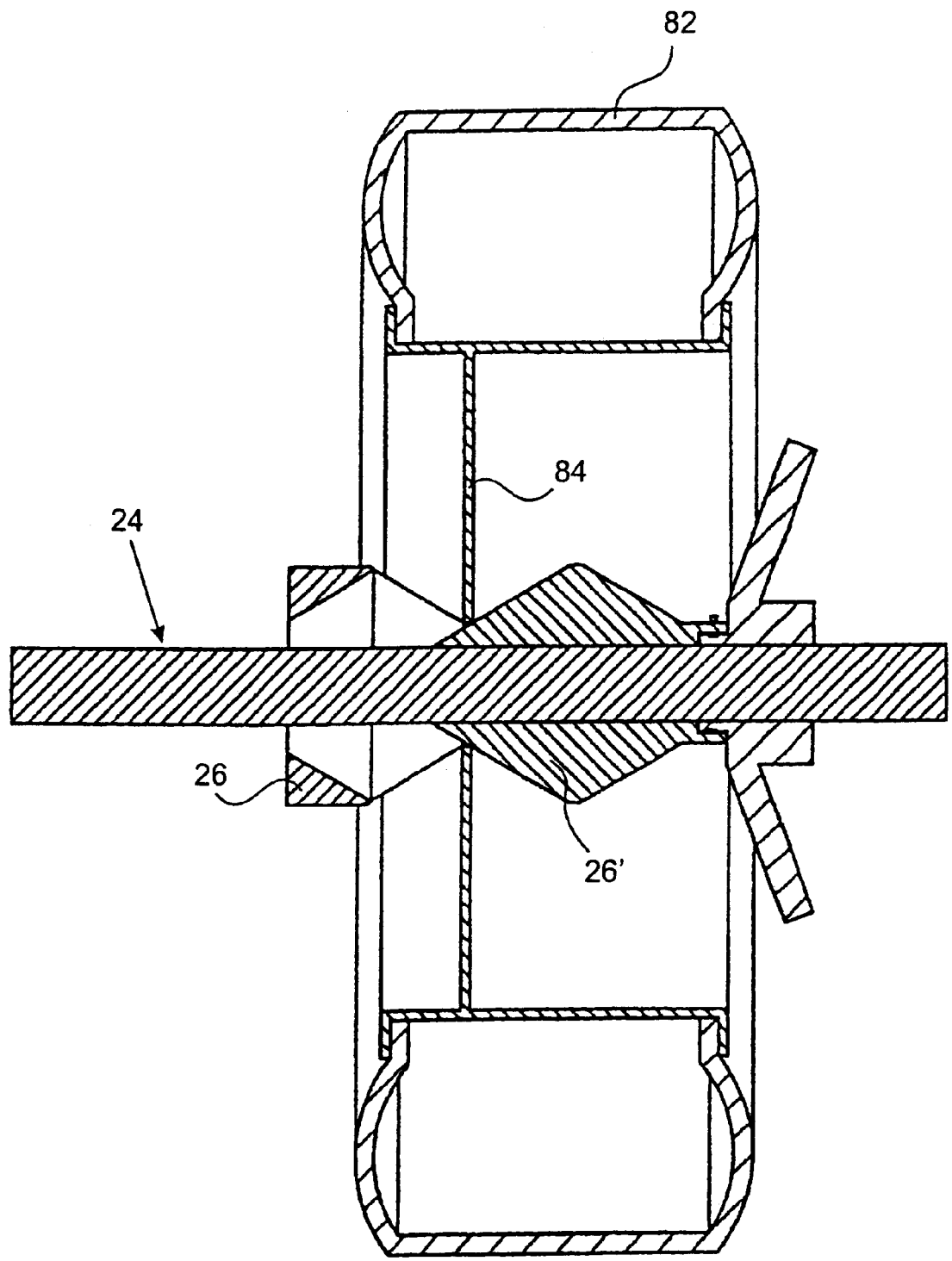
FIG. 8 shows a section through the fast clamping device and a wheel.

FIG. 8 shows a section through the fast clamping device and the wheel. The wheel 28 has a tire 82 and a rim 84 which is supported between the two parts 26 and 26' of the fast clamping device. The fast clamping device is tightened thereby that the wheel is positioned on the part 26 of the fast clamping device, and the part 26' is screwed onto the shaft 24 such that the rim is claimed between the parts 26, 26'.

It is to be understood that the above description is intended to be illustrative and not restrictive. Many embodiments will be apparent to those skilled in the art upon reviewing the above description. Those skilled in the art will recognize as an equivalent or alternative method of tire testing, the scope of the invention should, therefore, be determined not as reference to the above description, but should instead be determined with reference to the appended claims along with the full scope of equivalence to which such claims are entitled.

What is claimed is:

1. A tire testing apparatus having:
    an air pressure means for altering the tire pressure,
    a test head and a computer, which before and after an alteration in the air pressure, using coherent radiation, produce a respective interferogram of the tire surface and, from the interferogram, derive the information concerning any defects in the tire, the tire testing apparatus comprising:
    a rotatably supported shaft on which the wheel with the tire to be tested, is mounted;
    a bearing device by which the wheel with the shaft is shiftably supported in longitudinal direction of the shaft;
    a shaft locking device by which the shaft is lockable with respect to a movement in the longitudinal direction of the shaft; and
    a wheel locking device by which the wheel is mechanically locked against further rotation after the wheel has been further rotated by hand by an amount of a test segment and when the next segment is in test position in front of the test head.

2. The apparatus as claimed in claim 1, wherein the computer comprises a storage in which a table is stored which contains data as to the number of segments which are required to be inspected, the number depending on the size of the wheel.

3. The apparatus as claimed in claim 1, wherein the bearing device comprises a rotatably supported outer shaft and an inner shaft rotatably supported within the outer shaft as well as an unlockable locking device connecting the outer shaft to the inner shaft.

4. The apparatus as claimed in claim 1, wherein the locking device comprises a clamping hub between the outer shaft and the inner shaft and a lockable locking wheel, whereby the locking of the locking device may be loosened or tightened by rotating the inner shaft.

5. The apparatus as claimed in claim 1, wherein the guiding device for the test head comprises a crank drive which is mechanically or hydraulically or electromagnetically lockable.

6. The apparatus as claimed in claim 1, wherein the crank drive is arranged in a vertical direction and perpendicular to the longitudinal direction of the shaft.

7. The apparatus as claimed in claim 1, wherein the guiding device and the test head are integrated into a housing on the testing apparatus.

8. The apparatus as claimed in claim 1, comprising a camera which is arranged in the test head and which is directed to the tire, whereby the field of view of the test head is inspected by means of the camera and the picture taken from the camera is adapted to the displayed on the monitor.

9. The apparatus as claimed in claim 1, wherein the wheel locking device comprises index discs arranged on the outer shaft having index recesses the number of which corresponds to a different number of test segments, and wherein a lever with a cam is provided which engages the index recesses with the cam.

10. The apparatus as claimed in claim 1, comprising a distance setting device for setting the distance between the test head and the tire.

11. The apparatus as claimed in claim 1, wherein the distance adjusting device comprises a mechanical keying device on the test head which keying device touches the tire upon reaching the test distance.

12. The apparatus as claimed in claim 1, comprising a valve which may be adjusted with respect to the size of its opening as well as with respect t the opening time duration.

13. The apparatus as claimed in claim 12, comprising a main or central control device for controlling the air pressure in the tire whereby the pressure in the tire is to be reduced for each test step by one step and has to be brought back to the nominal pressure upon termination of a test.

* * * * *